United States Patent [19]

Noda et al.

[11] Patent Number: 4,774,588
[45] Date of Patent: Sep. 27, 1988

[54] FLICKERLESS TELEVISION CAMERA

[75] Inventors: Masaru Noda, Kanagawa; Toshiro Kinugasa, Hiratsuka, both of Japan

[73] Assignee: Hitachi, Ltd., Tokyo, Japan

[21] Appl. No.: 111,285

[22] Filed: Oct. 22, 1987

[30] Foreign Application Priority Data

Oct. 22, 1986 [JP] Japan .................... 61-249660

[51] Int. Cl.$^4$ .................... H04N 5/235; H04N 3/14
[52] U.S. Cl. .................... 358/213.19; 358/228; 358/213.13
[58] Field of Search .................... 358/213.13, 213.19, 358/228, 214-216, 75

[56] References Cited

U.S. PATENT DOCUMENTS 4,595,946 6/1986 Uehara et al. .................... 358/29 C
4,691,228 9/1987 Nagano .................... 358/75
4,718,768 1/1988 Houki et al. .................... 358/75

FOREIGN PATENT DOCUMENTS 56-149179 11/1981 Japan .

Primary Examiner—Jin F. Ng
Assistant Examiner—Stephen Brinich
Attorney, Agent, or Firm—Antonelli, Terry & Wands

[57] ABSTRACT

Disclosed is a television camera in which the charge in photodiodes arranged in the form of matrix is cleared the accumulation period Ta before the charge is read out of the photodiodes, the accumulation period Ta being set to a value substantially integer times as large as the on-off period of a light source so as to make the charge accumulated in the photodiodes in the accumulated period Ta constant regardless of the on-off of the light source to thereby prevent generation of a flicker.

8 Claims, 7 Drawing Sheets

FLICKERLESS TELEVISION CAMERA

BACKGROUND OF THE INVENTION

1. Field of the Invention

The present invention relates to a television camera and particularly relates to a television camera in which flicker generated when a subject is photographed under illumination of a fluorescent lamp can be suppressed.

2. Description of the Prior Art

Conventionally, when a subject is picked up under illumination of a fluorescent lamp by using a television camera, there has been a problem in that the light intensity of the fluorescent lamp changes periodically in accordance with the frequency of the power source, so that a flicker is generated by a beat between the frequency of change of the light intensity and the field frequency of the television signal. An explanation about the causes and characteristics of flicker generation and a flicker suppressing method are described in Japanese Patent Unexamined Publication (JP-A) No. 56-149179. The Publication discloses a television camera in which a flicker component of a frequency (20 Hz in the case of the power source of 50 Hz) corresponding to the greatest common measure between the on-off frequency of the fluorescent lamp (ordinarily, twice as high as the power source frequency) and the field frequency is extracted from a video signal, and the extracted flicker component is fedback or fedforward to thereby cancel the flicker.

To prevent a flicker from occurring by the above-mentioned method, it is necessary to adjust the quantity of feedback or feedforward accurately.

Further, in an image pickup element, such as a MOS image pickup element or image pickup tube, of the type in which the charge accumulated in photodiodes arranged in the form of matrix or light receiving films is read out by successively scanning the photodiodes or light receiving films line by line, a flicker appears on a scene of television picture as if it moves with a frequency of 20 Hz, however, the flicker is put out in a video signal as a flicker of 100 Hz. That is, at any specific point on the scene of television picture, the flicker is appears at a frequency of 100 Hz. Accordingly, it is impossible to prevent this flicker by the method disclosed in the above Japanese Patent Unexamined Publication No. 56-149179.

SUMMARY OF THE INVENTION

It is an object of the present invention to provide a television camera in which a flicker is prevented from occurring.

The television camera according to the present invention is provided with a charge sweep-out means arranged to sweep away video signal charge which has been accumulated up to that time in a photoelectric conversion element of a CCD or MOS solid-state image pickup element, at a point in time Ta sec before the video signal charge is read out from the photoelectric conversion element. The accumulation period Ta is set approximately to a value integer times as large as the on-off period of the illumination light source (a half of a reciprocal of the frequency of the AC power source in the case of a fluorescent lamp). The video signal charge read out from a photoelectric conversion element at a point in time t is that accumulated in the photoelectric conversion element through photoelectric conversion in the period Ta sec from the point in time (t-Ta) to the point in time t, and is proportional to the time quadrature of the light intensity of the light source in this period Ta. As is represented by a fluorescent lamp, the light intensity of a light source lighted by an AC power source changes every moment. However, by making the period Ta equal to a value integer times as large as the on-off period of the power source, the value of the time quadrature in this period Ta becomes constant. Because the same condition is satisfied with respect to any other point in time t, no flicker is generated in the video signal obtained from such an image pickup portion as described above.

DESCRIPTION OF THE PREFERRED EMBODIMENTS

Figure 1:
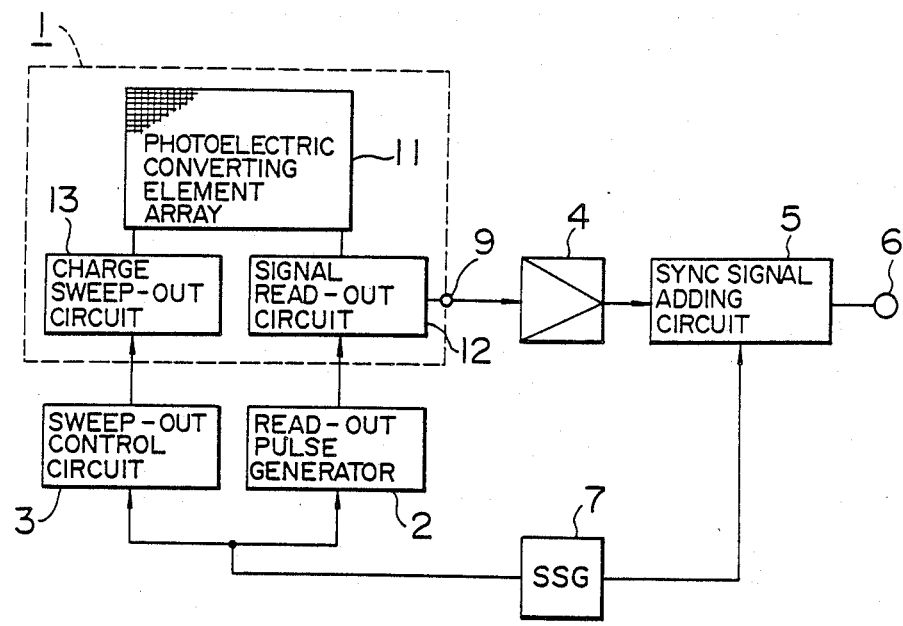
FIG. 1 is a block diagram showing an embodiment of the present invention.
Figure 2:
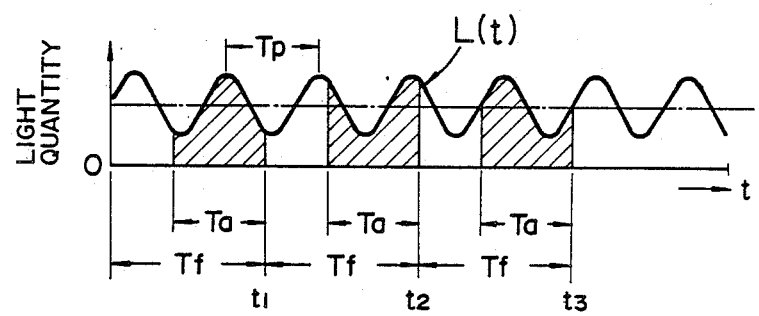
FIG. 2 is a diagram showing a waveform for explaining the operation of the circuit of FIG. 1.

FIG. 1 is a circuit block diagram of the television camera according to a first embodiment of the present invention and FIG. 2 is a diagram for explaining the operation of the circuit of FIG. 1.

The television camera according to the present invention is constituted by a solid-state image pickup element 1, a signal reading pulse generating circuit 2, a charge sweep-out control circuit 3, an amplifier 4, a synchronizing signal adding circuit 5, a video signal output terminal 6, and a synchronizing signal generator 7. The image pickup element 1 is constituted by a photoelectric conversion element array 11, a signal sweep-out circuit 12, and a charge sweep-out circuit 13. The photoelectric conversion element array 11 is constituted by, for example, lattice-like arranged photodiodes D (see FIG. 5) for photoelectrically converting incident light into electrical charge and for accumulating the resultant electrical charge. The signal sweepout circuit 12 is constituted by a row of MOS switches arranged to be successively turned on/off by vertical and horizontal scanning pulses and signal lines in a MOS image pickup element, while constituted by charge coupled devices (CCDs) for horizontally and vertically transferring signal charge accumulated in the photodiodes in a CCD image pickup element. In either type of image pickup element, the signal sweep-out circuit 12 reads out the charge accumlated in the photodiodes D at a signal read-out timing and transfers the read-out charge to an output terminal 9 of the image pickup element 1. The charge sweep-out circuit 13 sweeps out the accumulated charge from the photodiodes D Ta seconds before the point in time when the signal sweep-out circuit 12 reads the accumulated charge in the photodiodes D. Owing to the sweeping-out, the initial charge is set to a predetermined value. The charge sweep-out circuit 13 is, so to speak, a device for resetting the photodiodes D. The timing of the sweeping-out is controlled by the charge sweep-out control circuit 3.

Referring to FIG. 2, the reason why the flicker can be prevented by the circuit illustrated in FIG. 1 will be explained hereunder.

Although the light output of a fluorescent lamp lighted by an AC power source of a frequency of fp has a ripple component of a waveform approximate to that obtained by all-wave rectifying a waveform of an AC power source, the intensity of light output L(t) can be expressed by a sinusoidal wave of a frequency twice as high as the frequency fp as shown in FIG. 2 and in the following equation (1).

$$L(t) = 1 + m \cdot \sin(4\pi \cdot fp \cdot t) \quad (1)$$

FIG. 2 shows the change in light intensity under the conditions that the power source frequency fp is 50 Hz and the television field frequency is 60 Hz. The signal charge generated by photoelectric conversion carried out by the photodiodes in a minute time is proportional to the light intensity L(t) and the charge read out as a video signal is equal to the time quadrature of the charge generated in the photodiodes. Accordingly, the signal charge Q(t) read out at the read-out time t is expressed by the following equation (2).

$$Q(t) = \eta \times \int_{t-Ta}^{t} L(t) \cdot dt \quad (2)$$

where $\eta$ represents a photoelectric conversion efficiency.

Considering any one of the photodiodes, the charge reading-out is carried out at points in time $t_1, t_2, t_3, \ldots$ at an interval of a field period Tf which is a reciprocal of the field frequency and the quantity of charge read out at that time is proportional to the area of the hatched portion in FIG. 2. Generally, if the signal read out of any one of the photodiodes at any point in time is expressed by a current i(t), the current i(t) is expressed by the following equation (3) from the equations (1) and (2).

$$i(t) = \frac{Q(t)}{Tf} = \frac{Ta}{Tf} \cdot \quad (3)$$

$$\eta \left\{ 1 - m \frac{\sin(2\pi \cdot fp \cdot Ta)}{2\pi \cdot fp \cdot Ta} \cdot \sin(4\pi \cdot fp \cdot t - 2\pi \cdot fp \cdot Ta) \right\}$$

Figure 3:
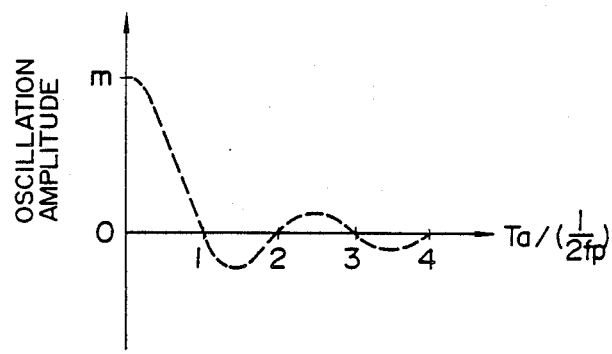
FIG. 3 is a graph for explaining the operation of the circuit of FIG. 1.

The second term in {} in the equation (3) is an oscillation term. In the equation (3), the time t may be set to any point in time continuously along a time axis in the case of a MOS image takeup element, while the time t takes discrete points in time, for example, $t_1, t_2, t_3, \ldots$ as shown in FIG. 2, at an interval of a field period in the case of a CCD image pickup element. Accordingly, there is a difference in oscillation period of the oscillation term of the equation (3) between the MOS and CCD systems. In either system, however, the term in question is no other than a vibratory one. This oscillation is nothing but a flicker. The coefficient of the oscillation term $$m \frac{\sin(2\pi \cdot fp \cdot Ta)}{2\pi \cdot fp \cdot Ta}$$

is well known sinusoidal integral function and can be illustrated as FIG. 3. The oscillation becomes zero at points where the accumulation period Ta becomes a reciprocal of a frequency twice as high as the power source frequency fp, that is, becomes a value integer times (n times) as large as the on-off period Tp of a fluorescent lamp, that is, at the points indicated by 1, 2, 3, 4 in FIG. 3.

FIG. 2 shows the characteristic in the case where the value of n is set to 1 (one), that is, the accumulation period Ta is set to the on-off period Tp. In FIG. 2, all the respective values of time quadrature of the light intensity in the accumulation period Ta at the points in time $t_1, t_2, t_3, \ldots$ are equal to each other.

Accordingly, if the charge sweeping-out timing is made to precede the signal reading-out timing $t_1, t_2, t_3, \ldots$ by the accumulation period Ta seconds which is selected to be integer times as large as the on-off period Tp of the power source, the generation of a flicker can be suppressed. For example, in the case where the power source frequency is 50 Hz, it is optimum to select the accumulation period Ta to be 1/100 seconds.

Figure 4:
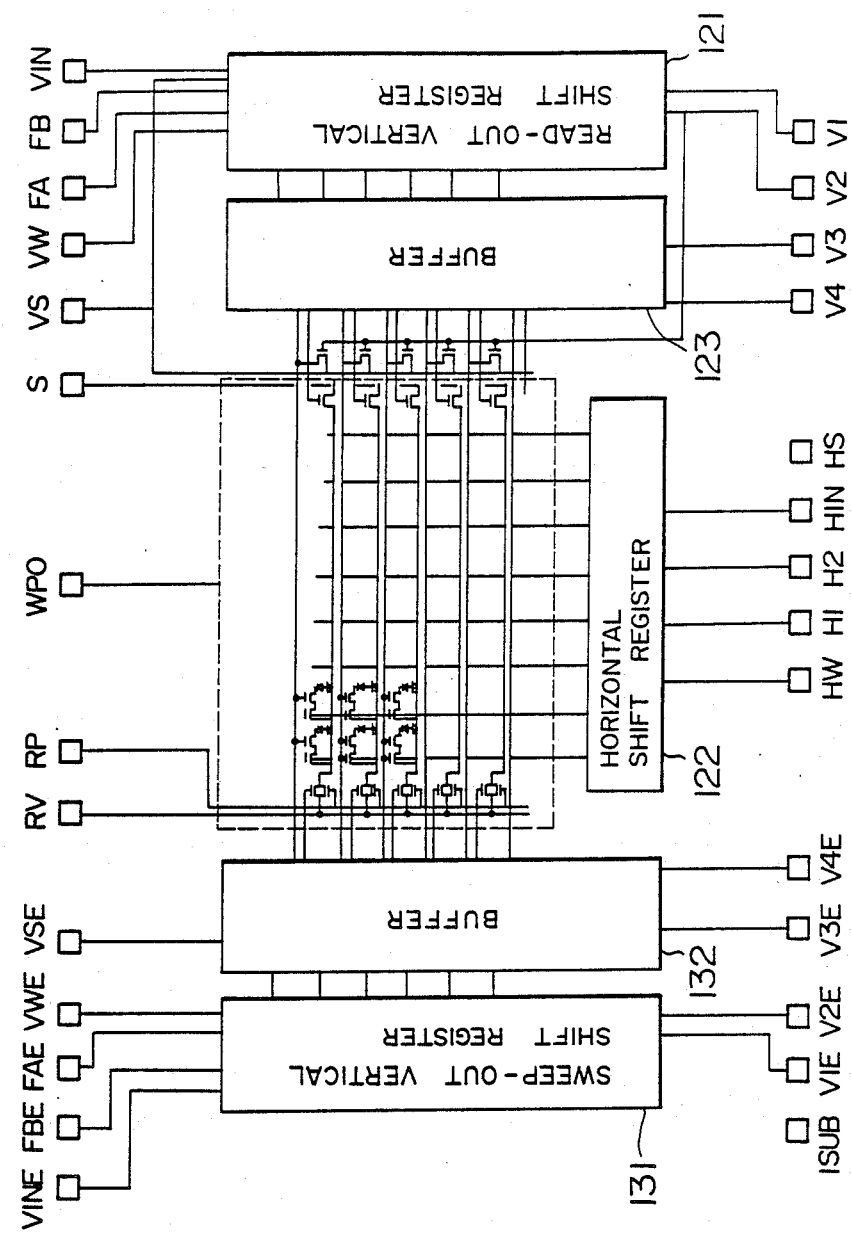
FIG. 4 is a block diagram showing another embodiment of the present invention.
Figure 5:
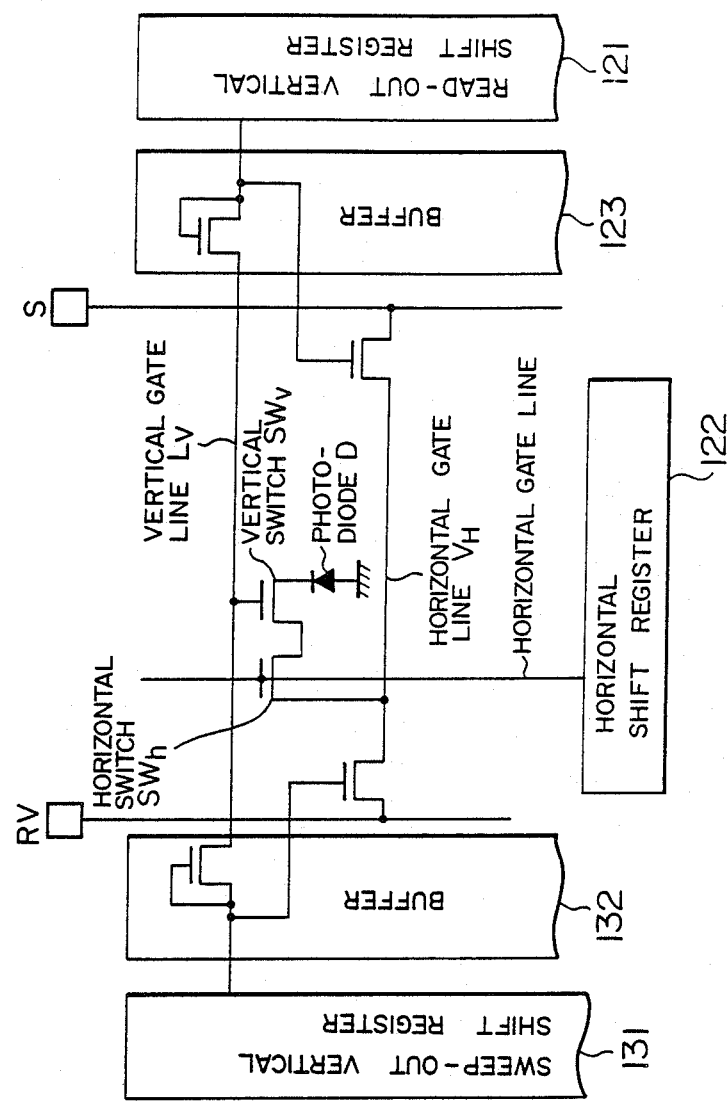
FIG. 5 is a diagram showing the arrangement of a main part of FIG. 4.

FIG. 4 is a circuit diagram showing an embodiment of the television camera according to the present invention. That is, FIG. 4 is a circuit diagram of MOS image pickup element in which charge can be swept out. This MOS image pickup element has a sweeping-out vertical shift register 131 as shown at the left side in the drawing, and the pickup element is greatly different in this point from an ordinary MOS image pickup element. The illustrated pickup element is, so to speak, an XY-address type image pickup element. When both vertical and horizontal gate pulses produced from a read-out vertical shift register 121 and a horizontal shift register 122 respectively and applied to one of photodiodes become high in level at the same time, the one photodiode D is selected to be an object for the charge reading-out so that the charge accumulated in the thus selected photodiode D is read out. FIG. 5 shows one of the photodiodes which is determined by a given one of the rows and a given one of the columns of the photodiodes D. $Ta = mT_H$ seconds before the read-out vertical shift register 121 sends out a high level pulse onto a vertical gate line Lv on the given row, the sweep-out vertical shift register 131 sends out a high level pulse onto the same vertical gate line Lv. Here, $T_H$ represents a horizontal scanning period and m is an integer.

In the photodiode D connected to the vertical gate line on which the high level pulse is applied from the sweep-out vertical shift register 131, the accumulated charge in the photodiode D is swept out to a charge sweep-out terminal RV by the high level pulse so that the photodiode D is reset. Accordingly, the signal produced at a signal output terminal S in response to the high level pulse from the read-out vertical shift register 121 is proportional to the charge accumulated in the photodiode D for the period $Ta = mT_H$.

Buffers 132 and 123 are provided to define the direction of sending out pulses so that the sweepout vertical shift register 131 and the read-out vertical shift register 121 are not made to be a load to each other. In an NTSC television camera, the relation between the field period Tf and the horizontal scanning period $T_H$ is defined by the following equation (4).

$$Tf = \frac{525}{2} \cdot T_H = 1/60 \quad (4)$$

The value of m can be obtained from the following equation (5).

$$m = \frac{525}{2} \times \frac{Ta}{Tf} \quad (5)$$

For example, in order to set Ta=1/100 sec, m is calculated to be 157.5 and therefore an integer, 158 or 157, is selected as the value of m. In the case where m is selected to be 158 or 157, the value of Ta comes off by about 0.3% from 1/100 sec. However, the degree of flicker due to this time lag is so small that no problem is not generated in practice.

The case where the present invention is applied to a television camera in which a CCD image pick-up element is used. The CCD image pickup element is constituted by an image pickup portion, an accumulating portion, a read-out register, and so on, and the image pickup portion is constituted by a photoelectric conversion portion (photodiodes), a driving portion, and buried CCDs. The charge generated by the photodiode is read out into the accumulating portion by the buried CCD and put out by the read-out register as a video signal.

In the case where the present invention is applied to the CCD image pickup element, the charge of the photodiode is cleared Ta sec. before the charge reading-out by the buried CCD. The charge of the photodiode ma be cleared by a method in which the charge is swept out into an overflow drain adjacent to the photodiode, a method in which a buried CCD for clearing is provided and the charge is swept out to the outside by the clearing buried CCD, or the like. By making the charge reading-out by the clearing buried CCD precede the charge reading-out by a signal-reading buried CCD by Ta sec (Ta=nTp: where Tp is an on-off period of the light source, and n=1, 2, ...), the generation of flicker can be suppressed.

Figure 6:
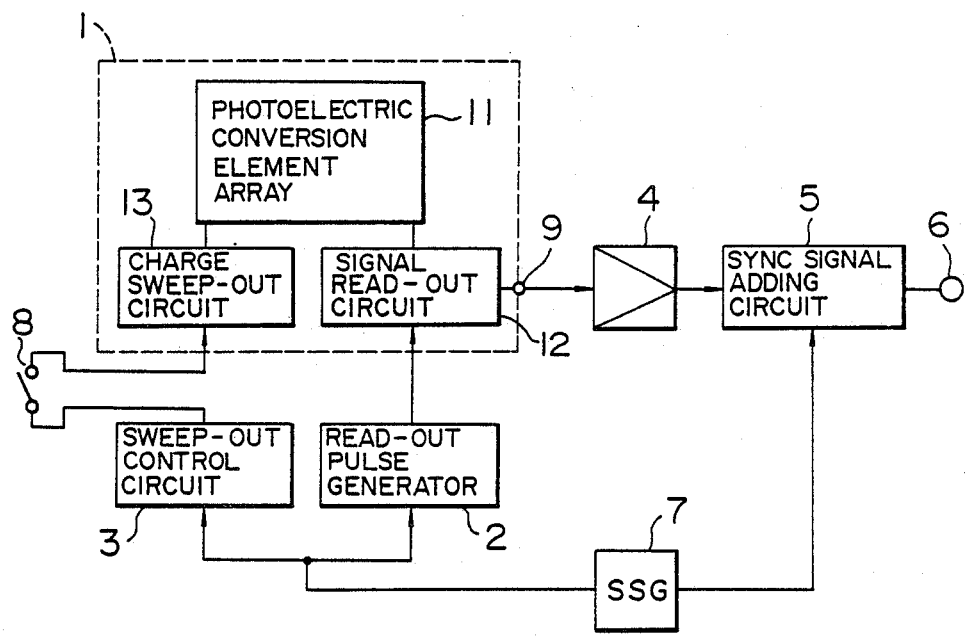
FIG. 6 is a block diagram showing a further embodiment of the present invention.

FIG. 6 shows another embodiment, in which a switch 8 for change-over a charge sweep-out mechanism between operation and stoppage is provided in the addition to the circuit of FIG. 1. The restriction of the signal charge accumulation period Ta causes reduction of the signal current in comparison with the case where the charge is accumulated for a full time of the field period Tf. Accordingly, particularly in the case where an image is picked up under the condition of insufficient illumination, there is a possibility of occurrence of insufficient sensitivity. In the case where the illumination light source has no periodic change in light intensity like an incandescent lamp, therefore, the switch 8 is turned off so as to stop the operation of the charge sweep-out circuit 13, so that image-pickup can be carried out with high sensitivity.

In the television camera to be used in any one of a plurality of areas which are different in on-off frequency of the light source (mainly, areas different in frequency of the commercial power source), it is preferable to provide means for externally control the charge sweep-out control circuit 3 so as to change-over the signal charge accumulation period Ta in accordance with the on-off frequency of the light source.

Next, an explanation with be made about a television camera provided with an accumulating time automatically setting circuit for automatically detecting the on-off frequency of the light source to control the charge sweep-out control circuit 3 so as to automatically change-over the signal charge accumulation period Ta.

Figure 7:
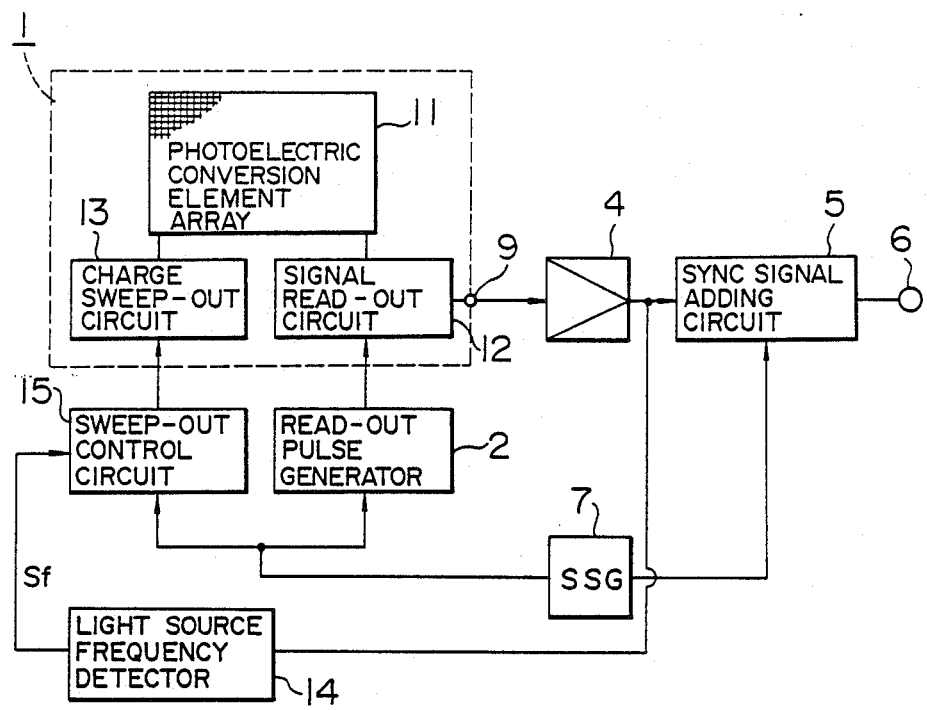
FIG. 7 is a block diagram showing a still further embodiment of the present invention.

The television camera shown in FIG. 7 is provided with a light source frequency detection circuit 14 arranged to receive a video signal read out from a photoelectric conversion element array 11 by a signal sweep-out circuit 12. The light source frequency detection circuit 14 detects the frequency of the periodical change of the intensity of the light incident upon the photoelectric conversion element array 11 and supplies a detection signal Sf to a sweep-out control circuit 15. In response to the detection signal Sf, the sweep-out control circuit 15 controls the charge-sweep timing of a charge sweep-out circuit 13. At that time, the sweep-out control circuit 15 controls the charge-sweep timing so that the accumulation period Ta is made to be Ta=1/(nfp) in the same manner as the charge sweep-out control cirucit 3 of FIG. 1, where fp represents the frequency indicated by the detection signal Sf.

Figure 8:
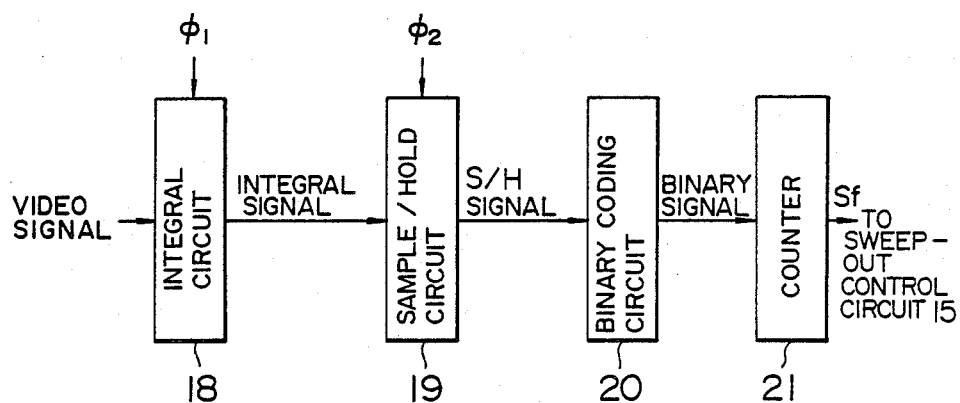
FIG. 8 is a diagram of an embodiment of the light source frequency detection circuit.

Next, an embodiment of the light source frequency detection circuit 14 is illustrated in FIG. 8. In the drawing, the light source frequency detection circuit 14 is constituted by an integration circuit 18 supplied with a video signal, a sampling-holding circuit 19, a binary coding circuit 20, and a counter 21. The sampling-holding circuit 19 is supplied with a sampling-holding pulse $\phi_2$.

Figure 9:
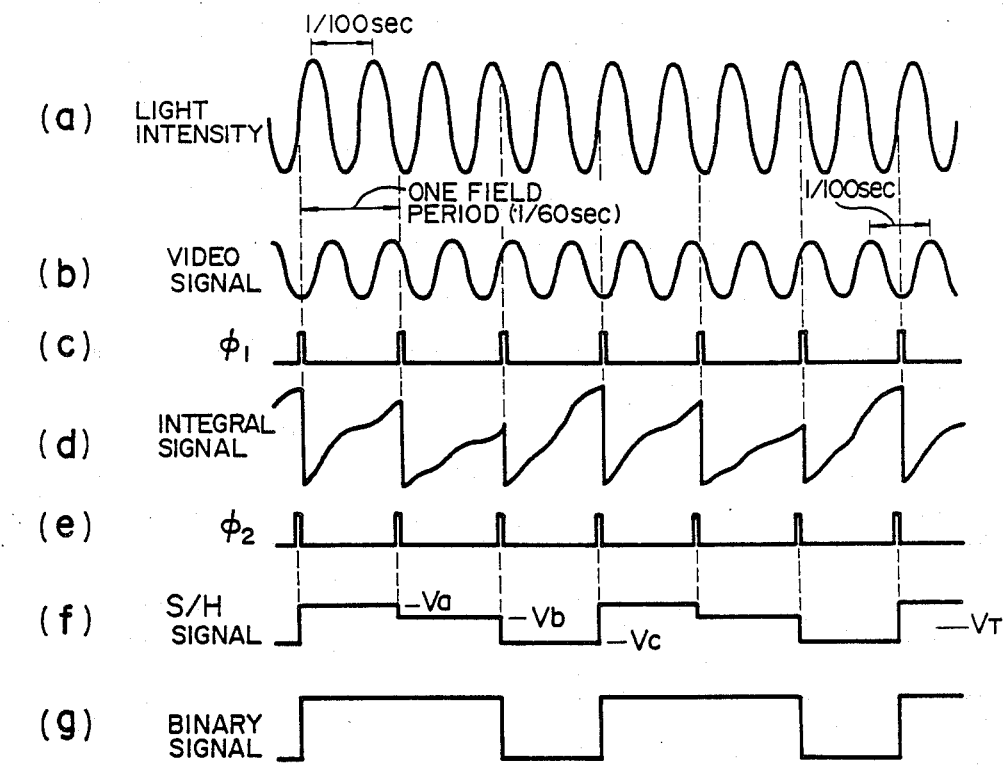
FIG. 9 is a diagram showing waveforms for explaining the operation of the circuit of FIG. 8.

FIG. 9 shows operational waveforms of various signals in the circuit of FIG. 8 when a fluorescent lamp driven by a commercial power source having a frequency of 50 Hz is used.

Under the condition that the frequency of the commercial power source is 50 Hz, the light intensity of the fluorescent lamp changes sinusoidally with a period of 1/100 sec as shown in the waveform (a) of FIG. 9. Accordingly, in the case where the signal reading-out from a photoelectric conversion element is carried out time-sequentially like in the MOS image pickup element, the video signal has a waveform having a repetition period of 1/100 sec as shown in the waveform diagram (b) of FIG. 9. If the video signal is integrated by the integration circuit 18 for a period of every field, integration signals different in signal level from each other can be obtained respectively in the three successive fields at a period of 1/20 sec (equal to the period over three fields) which is the least common multiple between 1/100 sec and 1/60 sec. If the integration signal is sampled and held at a phase immediately before the integration signal is reset by an integration reset signal $\phi_1$, the sampling-holding signal S/H has a waveform having three level values Va, Vb and Vc which are successively repeated as shown in the diagram (f) of FIG. 9. The sampling-holding signal S/H is binary coded by the binary coding circuit 20 with a threshold $V_T$ which satisfies the relation Vc<$V_T$<Vb, so that a binary signal as shown in the diagram (g) of FIG. 9 is obtained. The binary signal is counted by the counter 21, so that a frequency corresponding to the greatest common measure between the on-off frequency of the fluorescent lamp and the field frequency (which is equal to the reciprocal of the signal accumulation period with respect to one pixel of the image pickup element) is detected. The thus detected frequency is the frequency of a flicker. In an NTSC television camera, the field frequency is 60 Hz so that the frequency indicated by a detection signal Sf of the counter 21 is 20 Hz in an area where the commercial power source frequency is 50 Hz because the on-off frequency of the fluorescent lamp is 100 Hz in this area, while the frequency indicated by a detection signal Sf of the counter 21 becomes 0 Hz in the other area where the commercial power source frequency is 60 Hz because the on-off frequency of the fluorescent lamp becomes 120 Hz in this area.

Figure 10:
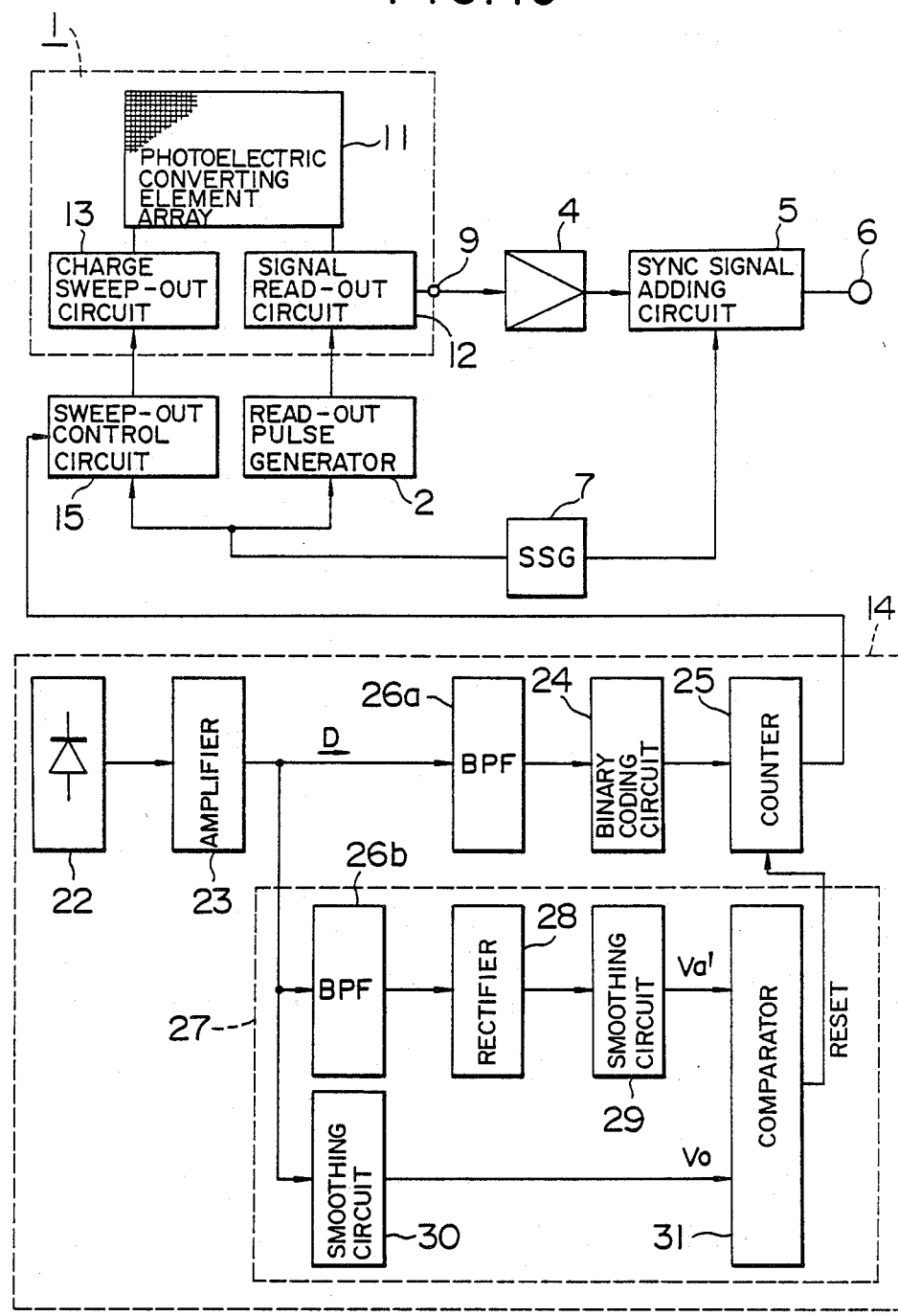
FIG. 10 is a block diagram showing another embodiment of the present invention.

Next, FIG. 10 shows another television camera provided with a light source frequency detection circuit 14 arranged to detect the frequency of the light source by a light reception element 22 provided separately from the image pickup element 1. In the drawing, the light source frequency detection circuit 14 is constituted by the light reception element 22, an amplifier 23, a binary coding circuit 24, a counter 25, band-pass filters 26a and 26b, a rectifier 28, smoothing circuits 29 and 30, and a comparator 31. The output of the light source frequency detection circuit 14 is supplied to a sweep-out control circuit 15 so that the accumulation period Ta is adjusted in accordance with the on-off frequency of the light source like in the circuit of FIG. 7.

Figure 11:
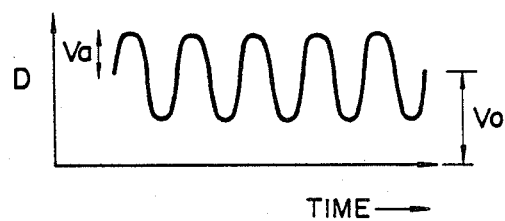
FIG. 11 is a diagram for explaining the operation of FIG. 10.

The operation of the light source frequency detection circuit 14 will be described. The light reception element 22 is provided separately from the image pickup element 1 and substantially the same light as that incident upon the image pickup element 1 is made incident upon the light reception element 22. The output of the light reception element 22 is amplitude by the amplifier 23 and the output signal D of the amplifier 23 is supplied to the binary coding circuit 24 through the band-pass filter 26a so as to be binary coded by the binary coding circuit 24. The binary output of the binary coding circuit 24 is applied to the counter 25. In most cases, the output signal D of the amplifier 23 has a DC component of the illumination light (of a level $V_o$) and an AC component (of an amplitude $V_a$) which are superimposed on each other as shown in FIG. 11. This applies to a case where a fluorescent lamp is additionally lighted in a room into which the sunlight is incident. In this case, a flicker appears more remarkably as the ratio of $V_a$ to $V_o$, that is, $V_a/V_o$, becomes larger. Accordingly, the counter 25 is controlled by a reset circuit 27 so as to start its operation when the ratio $V_a/V_o$ becomes equal to or larger than a predetermined level and so as to stop its operation when the ratio $V_a/V_o$ becomes smaller than the predetermined level. The reset circuit 27 is constituted by the band-pass filter 26b, the rectifier 28, the smoothing circuit 29 and 30, and the comparator 31. Only the AC component of the output signal D is extracted by the band-pass filter 26b and converted into a DC signal $V_a'$ proportional to the value $V_a$ on one band, and the DC component $V_o$ is obtained by the smoothing circuit 30 on the other. The values $V_a$ and $V_a'$ are compared with each other in the comparator 31 so that the counter 25 is actuated to operate only when the ratio $V_a/V_o$ is equal to or larger than the predetermined level. Thus, the detection of the light source frequency is carried out only when the ratio $V_a/V_o$ is equal to or larger than the predetermined level and is not performed when the ratio $V_a/V_o$ is lower than the predetermined level.

The sweep-out control circuit 15 performs the control of the accumulation period Ta on the basis of the output signal of the counter 25, while controls the charge sweep-out circuit 13 with a predetermined value of the accumulation period Ta when the counter 25 does not perform its counting operation. Thus, it is possible to prevent disadvantage due to insufficient light intensity under low intensity of illumination.

It is matter of course that the present invention can be applied not only to a monochromic camera but to a color camera.

As described above, according to the present invention, generation of a flicker can be prevented by the image pickup element per se so that the adjustment required in the prior art for canceling a flicker becomes unnecessary and a television camera in which a flicker can be suppressed stably and surely can be realized. Further, the present invention is applicable to both the MOS and CCD solid-state image pickup elements.

We claim:

1. A television camera comprising:
    image pickup sensor means for generating electric charge corresponding to light intensity of light incident upon said image pickup sensor from a subject, and for accumulating the generated charge therein;
    signal read-out means connected to said image pickup sensor means for reading out the charge accumulated in said image pickup sensor means;
    accumulated charge sweep-out means connected to said image pickup sensor means for sweeping out the charge accumulated in said image pickup sensor means an accumulation period Ta before the charge reading-out operation of said signal read-out means; and
    sweep-out timing control means connected to said accumulated charge sweep-out means for producing a control signal for setting said accumulation period Ta to a value substantially an integral multiple of a period of changes of light intensity of a light source illuminating said subject, said control signal being applied to said accumulated charge sweep-out means.

2. A television camera according to claim 1, in which said image pickup sensor means is of a MOS type, in which said signal read-out means is provided with a horizontal shift register and a vertical shift register, and in which said accumulated charge sweep-out means is provided with another vertical shift register for sweep operation independently of said vertical shift register of said signal read-out means.

3. A television camera according to claim 1, in which said sweep-out timing control means sets said accumulation period Ta so as to satisfy the equation $Ta = \frac{1}{2}f$ where f represents a frequency of an AC power source of said light source.

4. A television camera according to claim 1, in which said image pickup sensor means is of a CCD type, wherein said signal read-out means includes a first buried CCD, said accumulated charge sweep-out means includes a second buried CCD provided separately from said first buried CCD.

5. A television camera according to claim 4, in which said second buried CCD transfers the charge said accumulation period Ta before said first buried CCD transfers the charge.

6. A television camera according to claim 1, in which said image pickup sensor means is of a CCD type, wherein said signal read-out means includes a buried CCD, said accumulated charge sweep-out means includes an overflow drain provided adjacent to said image pickup sensor means.

7. A television camera according to claim 1, further comprising light source frequency detection means for detecting a frequency of the changes of light intensity of said light source, said sweep-out timing control means being connected to said light source frequency detection means so as to respond to an output of said light source frequency detection means to thereby set said accumulation period Ta of said accumulated charge sweep-out means to a value substantially an integral multiple of the period of changes of light intensity of said light source.

8. A television camera according to claim 7, in which said light source frequency detection means includes light reception element means provided separately from said image pickup sensor means, binary coding means for binary coding an output of said light reception element means, and counter means for counting an output of said binary coding means.

* * * * *